US012724833B2

(12) United States Patent
Dozen et al.

(10) Patent No.: US 12,724,833 B2
(45) Date of Patent: Sep. 1, 2026

(54) DOCUMENT SEARCH SYSTEM AND METHOD FOR OUTPUTTING DOCUMENT SEARCH RESULT

(71) Applicant: SEMICONDUCTOR ENERGY LABORATORY CO., LTD., Atsugi (JP)

(72) Inventors: Yoshitaka Dozen, Atsugi (JP); Kunitaka Yamamoto, Atsugi (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 18/265,105

(22) PCT Filed: Nov. 29, 2021

(86) PCT No.: PCT/IB2021/061034
§ 371 (c)(1),
(2) Date: Jun. 2, 2023

(87) PCT Pub. No.: WO2022/123386
PCT Pub. Date: Jun. 16, 2022

(65) Prior Publication Data

US 2024/0004936 A1 Jan. 4, 2024

(30) Foreign Application Priority Data

Dec. 10, 2020 (JP) ................................ 2020-204834

(51) Int. Cl.
*G06F 16/9038* (2019.01)
*G06F 16/93* (2019.01)

(52) U.S. Cl.
CPC .......... *G06F 16/9038* (2019.01); *G06F 16/93* (2019.01)

(58) Field of Classification Search
CPC .. G06F 16/9038; G06F 16/93; G06F 2216/11; G06F 16/338; G06Q 50/18
(Continued)

(56) References Cited

U.S. PATENT DOCUMENTS 5,819,273 A * 10/1998 Vora ........................ G06F 16/33 707/E17.061
2007/0208669 A1* 9/2007 Rivette ................ G06Q 50/184 705/310
(Continued)

FOREIGN PATENT DOCUMENTS

JP 05-046662 A 2/1993
JP 2006-127523 A 5/2006
(Continued)

OTHER PUBLICATIONS

International Search Report (Application No. PCT/IB2021/061034) Dated Mar. 22, 2022.
(Continued)

*Primary Examiner* — Cam Y T Truong
(74) *Attorney, Agent, or Firm* — NIXON PEABODY LLP; Jeffrey L. Costellia

(57) ABSTRACT

A search using a plurality of search queries and a check of a result of the search are performed efficiently. A plurality of search queries are received. A plurality of documents are searched on the basis of each of the plurality of search queries. A plurality of search results are obtained for each of the plurality of documents. The document search results are output by outputting the plurality of search results for each of the plurality of documents as a first table. One of a group of items on the vertical axis and a group of items on the horizontal axis in the first table represents the documents, and the other represents the search queries. The search result can be shown with two values indicating whether or not a
(Continued)

document satisfies a search query, with the number of blocks satisfying a search query in a document, or the like.

14 Claims, 9 Drawing Sheets

(58) Field of Classification Search
USPC .......................................................... 707/722
See application file for complete search history.

(56) References Cited

U.S. PATENT DOCUMENTS

| | | | | |
|---|---|---|---|---|
| 2010/0332477 | A1* | 12/2010 | Jeffs | G06Q 30/02 707/738 |
| 2012/0084297 | A1* | 4/2012 | Mishne | G06F 16/3322 707/E17.116 |
| 2012/0159368 | A1* | 6/2012 | Negrillo | G06F 16/248 715/771 |
| 2012/0221553 | A1* | 8/2012 | Wittmer | G06F 16/904 707/E17.014 |
| 2014/0358934 | A1* | 12/2014 | Hirose | G06F 16/285 707/741 |
| 2016/0224642 | A1* | 8/2016 | Miller | G06F 16/23 |
| 2018/0225291 | A1* | 8/2018 | Balinsky | G06F 40/284 |
| 2018/0314948 | A1* | 11/2018 | Nittka | G06F 16/7343 |
| 2019/0018837 | A1* | 1/2019 | Pino | G06F 40/289 |
| 2019/0303409 | A1* | 10/2019 | Nishino | G06F 3/14 |
| 2019/0370392 | A1* | 12/2019 | Cazin | G06F 16/334 |
| 2020/0364223 | A1* | 11/2020 | Pal | G06F 16/24539 |

FOREIGN PATENT DOCUMENTS

| | | | |
|---|---|---|---|
| JP | 2009-169926 | A | 7/2009 |
| JP | 2016-009233 | A | 1/2016 |

OTHER PUBLICATIONS

Written Opinion (Application No. PCT/IB2021/061034) Dated Mar. 22, 2022.

* cited by examiner

301a

301b

301c

...

Search

302

300

| No. | Name | 311a | 311b | 311c | ... |
| --- | --- | --- | --- | --- | --- |
| 1 | Patent A | ○ | × | ○ | ... |
| 2 | Patent B | ○ | × | × | ... |
| 3 | Patent C | × | × | × | ... |
| 4 | Patent D | × | ○ | × | ... |
| ⋮ | ⋮ | ⋮ | ⋮ | ⋮ | ⋮ |
| m | Patent M | × | ○ | ○ | ... |

320

310

DOCUMENT SEARCH SYSTEM AND METHOD FOR OUTPUTTING DOCUMENT SEARCH RESULT

TECHNICAL FIELD

One embodiment of the present invention relates to a document search system. One embodiment of the present invention relates to a document search method. One embodiment of the present invention relates to a method for outputting a document search result. One embodiment of the present invention relates to a method for displaying a document search result.

Note that one embodiment of the present invention is not limited to the above technical field. Examples of the technical field of one embodiment of the present invention include a semiconductor device, a display device, a light-emitting device, a power storage device, a memory device, an electronic device, a lighting device, an input device (e.g., a touch sensor), an input/output device (e.g., a touch panel), a method for driving any of them, and a method for manufacturing any of them.

BACKGROUND ART

Prior art search before application for an invention can reveal if there is a relevant intellectual property right. Domestic or foreign patent documents, papers, and the like obtained through the prior art search are helpful in confirming the novelty and non-obviousness of the invention and determining whether to file the application. In addition, patent invalidity search can reveal whether there is a possibility of invalidation of the patent right owned by an applicant or whether the patent rights owned by others can be rendered invalid.

A person creates a plurality of search queries for document search in some cases. For example, a plurality of queries can be considered in examining a certain topic, and it is sometimes difficult for a person to determine which search query to use in order to obtain a desired result. In addition, there is a case where a person wants to search documents for each of a plurality of components. In such a case, it is often a troublesome operation to search documents for a plurality of search queries one by one and check a plurality of search results.

Patent Document 1 discloses a method for graphically displaying electronic document searches, in which a Venn diagram including a plurality of circles is generated from results of searches using a plurality of search queries.

REFERENCE

Patent Document

[Patent Document 1] United States Patent Application Publication No. 2012/0221553

SUMMARY OF THE INVENTION

Problems to be Solved by the Invention

An object of one embodiment of the present invention is to provide a document search system or a method for outputting a document search result, which enables an efficient search using a plurality of search queries and an efficient check of a result of the search.

An object of one embodiment of the present invention is to provide a document search system or a method for outputting a document search result, which can be operated easily by a user. An object of one embodiment of the present invention is to provide a document search system or a method for outputting a document search result, which enables a user to obtain needed information efficiently.

Note that the description of these objects does not preclude the existence of other objects. One embodiment of the present invention does not need to achieve all of these objects. Other objects can be derived from the description of the specification, the drawings, and the claims.

Means for Solving the Problems

One embodiment of the present invention is a method for outputting a document search result, including the step of receiving a plurality of search queries; the step of searching a plurality of documents on the basis of each of the plurality of search queries and obtaining a plurality of search results for each of the plurality of documents; and the step of outputting the plurality of search results for each of the plurality of documents as a first table.

It is preferable that one of a group of items on the vertical axis and a group of items on the horizontal axis of the first table represent the documents and the other represent the search queries.

The first table can show the search result with two values indicating whether or not the document satisfies the search query. Alternatively, the first table can show the search result with the number of blocks satisfying the search query in the document.

One embodiment of the present invention is a method for outputting a document search result, including the step of receiving at least a first search query and a second search query; the step of searching a plurality of documents using each of the first search query and the second search query and obtaining a first search result based on the first search query and a second search result based on the second search query for each of the plurality of documents; and the step of outputting the first search result and the second search result for each of the plurality of documents as a first table. The first table can show the first search result for each of the plurality of documents in a first column and the second search result for each of the plurality of documents in a second column. Alternatively, the first table can show the first search result for each of the plurality of documents in a first row and the second search result for each of the plurality of documents in a second row.

The first table can show the first search result with two values indicating whether or not the document satisfies the first search query. Alternatively, the first table can show the first search result with the number of blocks satisfying the first search query in the document.

The step of receiving designation of the plurality of documents may be included before searching the plurality of documents.

One embodiment of the present invention is a document search system including a reception unit, a processing unit, and an output unit. The reception unit has a function of receiving a plurality of search queries. The processing unit has a function of searching a plurality of documents on the basis of each of the plurality of search queries and a function of obtaining a plurality of search results for each of the plurality of documents. The output unit has a function of outputting the plurality of search results for each of the plurality of documents as a first table.

It is preferable that one of a group of items on the vertical axis and a group of items on the horizontal axis of the first table represent the documents and the other represent the search queries.

The first table can show the search result with two values indicating whether or not the document satisfies the search query. Alternatively, the first table can show the search result with the number of blocks satisfying the search query in the document.

One embodiment of the present invention is a document search system including a reception unit, a processing unit, and an output unit. The reception unit has a function of receiving at least a first search query and a second search query. The processing unit has a function of searching a plurality of documents using each of the first search query and the second search query and a function of obtaining a first search result based on the first search query and a second search result based on the second search query for each of the plurality of documents. The output unit has a function of outputting the first search result and the second search result for each of the plurality of documents as a first table. The first table includes the first search result for each of the plurality of documents in a first column and the second search result for each of the plurality of documents in a second column. Alternatively, the first table includes the first search result for each of the plurality of documents in a first row and the second search result for each of the plurality of documents in a second row.

The first table can show the first search result with two values indicating whether or not the document satisfies the first search query. Alternatively, the first table can show the first search result with the number of blocks satisfying the first search query in the document.

The reception unit preferably has a function of receiving designation of the plurality of documents.

Effect of the Invention

With one embodiment of the present invention, a document search system or a method for outputting a document search result, which enables an efficient search using a plurality of search queries and an efficient check of a result of the search, can be provided.

With one embodiment of the present invention, a document search system or a method for outputting a document search result, which can be operated easily by a user, can be provided.

With one embodiment of the present invention, a document search system or a method for outputting a document search result, which enables a user to obtain needed information efficiently, can be provided.

Note that the description of these effects does not preclude the existence of other effects. One embodiment of the present invention does not need to have all of these effects. Other effects can be derived from the description of the specification, the drawings, and the claims.

MODE FOR CARRYING OUT THE INVENTION

Figure 1:
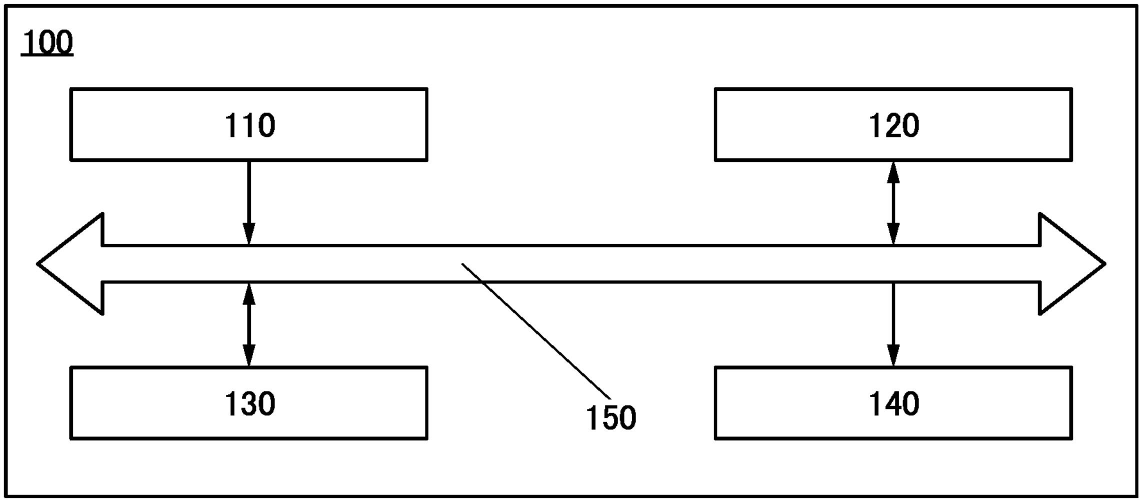
FIG. 1 is a diagram illustrating an example of a document search system.

Embodiments are described in detail with reference to the drawings. Note that the present invention is not limited to the following description, and it will be readily appreciated by those skilled in the art that modes and details of the present invention can be modified in various ways without departing from the spirit and scope of the present invention. Therefore, the present invention should not be construed as being limited to the description in the following embodiments.

Note that in structures of the invention described below, the same portions or portions having similar functions are denoted by the same reference numerals in different drawings, and the description thereof is not repeated. Furthermore, the same hatch pattern is used for the portions having similar functions, and the portions are not especially denoted by reference numerals in some cases.

Note that ordinal numbers such as "first", "second", and "third" used in this specification and the like are used in order to avoid confusion among components, and the terms do not limit the components numerically. For example, the first row is not limited to the first row and the first column is not limited to the first column.

The position, size, range, or the like of each component illustrated in drawings does not represent the actual position, size, range, or the like in some cases for easy understanding. Therefore, the disclosed invention is not necessarily limited to the position, size, range, or the like disclosed in the drawings.

Embodiment 1

In this embodiment, a document search system, a document search method, a method for outputting a document search result, and a method for displaying a document search result, which are embodiments of the present invention, are described with reference to FIG. 1 to FIG. 7.

In a document search system of one embodiment of the present invention, a plurality of documents are searched on the basis of each of a plurality of received search queries, and a plurality of search results are obtained for each of the plurality of documents. Furthermore, the plurality of search results for each of the plurality of documents are output in a table format.

For example, output can be performed by one or both of displaying search results on a display screen of a user's terminal and outputting a file in a CSV format or the like.

For example, one of a group of items on the vertical axis and a group of items on the horizontal axis of the table represents documents, and the other represents search queries.

As a specific example, in the case where a first search query and a second search query are received, first search results based on the first search query can be shown in a first column of a table, and second search results based on the second search query can be shown in a second column of the table. In addition, search results for a first document can be shown in a first row of the table, and search results for a second document can be shown in a second row.

Such output can enhance browsability of search results using a plurality of search queries.

Document Search System 1

FIG. 1 shows a block diagram of a document search system 100. The document search system 100 includes a reception unit 110, a storage unit 120, a processing unit 130, an output unit 140, and a transmission path 150.

The document search system 100 may be provided in a data processing device such as a personal computer used by the user. Alternatively, a processing unit of the document search system 100 may be provided in a server to be accessed by a client PC via a network and used.

Reception Unit 110

The reception unit 110 receives a search query. Note that the search query is an expression representing an idea the user wants to retrieve in a certain form, and refers to a variety of search conditions input when the user make a search. The search condition is not particularly limited and examples thereof include one or more keywords, one or more phrases, one or more sentences, and a search formula composed of an operator and at least one kind of one or more keywords, one or more phrases, and one or more sentences. Alternatively, a natural sentence may be received as the search query, and a word extracted by language processing may be used as a search keyword or a sentence vector may be generated using distributed representation.

The reception unit 110 can also receive designation of a document group (a plurality of documents) to be searched. Data supplied to the reception unit 110 is supplied to one or both of the storage unit 120 and the processing unit 130 through the transmission path 150.

In this specification and the like, a document means a description of a phenomenon in natural language, which is computerized and machine-readable, unless otherwise described. Examples of a document include patent applications, legal precedents, contracts, terms and conditions, product manuals, novels, publications, white papers, and technical documents, but are not limited thereto.

Storage Unit 120

The storage unit 120 has a function of storing a program executed by the processing unit 130. The storage unit 120 preferably has a function of storing search results obtained by the processing unit 130 and data in a table format generated by the processing unit 130. The storage unit 120 may have a function of storing a calculation result and an inference result generated by the processing unit 130, data input to the reception unit 110, and the like.

The storage unit 120 includes at least one of a volatile memory and a nonvolatile memory. As the volatile memory, a DRAM (Dynamic Random Access Memory), an SRAM (Static Random Access Memory), and the like can be given. Examples of the nonvolatile memory include an ReRAM (Resistive Random Access Memory, also referred to as a resistance-change memory), a PRAM (Phase change Random Access Memory), an FeRAM (Ferroelectric Random Access Memory), an MRAM (Magnetoresistive Random Access Memory, also referred to as a magneto-resistive memory), and a flash memory. The storage unit 120 may include a storage media drive. As the storage media drive, a hard disk drive (HDD), a solid state drive (SSD), or the like can be given.

The storage unit 120 may include a database containing document data.

The document search system 100 may have a function of extracting document data from a database existing outside the system. For example, the document search system 100 may have a function of extracting data from a database existing outside the system.

Alternatively, the document search system 100 may have a function of extracting data from both of its own database and an external database.

The database can have a structure containing either or both of text data and image data, for example.

One or both of a storage and a file server may be used instead of the database. For example, in the case where a file contained in a file server is used, the database preferably contains a path for the file stored in the file server.

An application database can be given as an example of the database. Examples of the application include applications relating to intellectual properties, such as a patent application, an application for utility model registration, and an application for design registration. There is no limitation on each status of the applications, i.e., whether or not it is published, whether or not it is pending in the Patent Office, and whether or not it is registered. For example, the application database can contain at least one of applications before examination, applications under examination, and registered applications, or may contain all of them.

For example, the application database preferably contains one or both of specifications and scopes of claims for a plurality of patent applications. The application database may further contain abstracts of a plurality of patent applications. The specification, scopes of claims, and abstracts are stored in text data, for example.

The application database may contain at least one of an application management number for identifying the application (including a number for internal use), an application family management number for identifying the application family, an application number, a publication number, a registration number, a drawing, an application date, a priority date, a publication date, a status, a classification (e.g., patent classification or utility model classification), a category, a keyword, and the like. These pieces of information may each be used to identify a document group when designation of a document group to be searched is received. Alternatively, these pieces of information may each be output together with a document search result.

Furthermore, various documents such as a book, a journal, a newspaper, and a paper can be managed with the database. The database contains at least text data of documents. The database may contain at least one of an identification number of each document, the title, the date of issue or the like, the author name, the publisher name, and the like. These pieces of information may each be used to identify a document group when designation of a document group to be searched is received. Alternatively, these pieces of information may each be output together with a document search result.

Note that the usage of the document search system of this embodiment is not particularly limited, and examples include prior art search and patent document invalidity search. Furthermore, for example, with academic proceedings set as a search target, a paper of interest can be found quickly from a list.

The storage unit 120 may include a thesaurus. When a thesaurus is included, for example, the processing unit 130 can add a synonym of a keyword included in a search query received by the reception unit 110. Note that the processing unit 130 or artificial intelligence (AI) may be used to create a thesaurus.

Processing Unit 130

The processing unit 130 has a function of performing processing such as calculation and inference with the use of data supplied from one or both of the reception unit 110 and the storage unit 120. The processing unit 130 has a function of performing processing with the use of various data contained in the database. The processing unit 130 can supply a processing result such as a calculation result or an inference result to one or both of the storage unit 120 and the output unit 140.

The processing unit 130 has a text search function. In particular, the processing unit 130 preferably has a text search function using a search formula generated by a combination of a keyword and a logical operator. The logical operator is also referred to as a Boolean operator, and examples include, but not limited to, AND, OR, and NOT.

The processing unit 130 has a function of generating data in a table format on the basis of a text search result.

The processing unit 130 may have a function of obtaining, using the thesaurus, a synonym of a keyword included in a search query received by the reception unit 110. In addition, the processing unit 130 may perform text search after the search query is updated using the synonym. Thus, the search accuracy can be increased. Note that as a synonym, in addition to a related term in the same language as the keyword, a term that is a translation of the keyword in another language and even a related term thereof may be included. For example, as a synonym of an English term “light shield”, an English term “light block”, and a Japanese term meaning “light shield”, and the like can be included.

The processing unit 130 may have a function of, using the text search result, presenting a combination of documents satisfying all search queries among a plurality of documents each satisfying one or more of the search queries. In this case, it is preferable to preferentially present a combination including a smaller number of documents. For example, a combination of a document X satisfying some of search queries and a document Y satisfying the remaining search queries can be presented. In this way, the user can check a document search result efficiently.

The processing unit 130 may also have a function of making an evaluation using a text search result. For example, with the use of the number of documents satisfying each search query, the number of documents satisfying all search queries, the number of combinations of documents satisfying all search queries, and the like, a score or a ranking may be calculated and output.

The processing unit 130 can include an arithmetic circuit, for example. The processing unit 130 can include, for example, a central processing unit (CPU).

The processing unit 130 may include a microprocessor such as a DSP (Digital Signal Processor) or a GPU (Graphics Processing Unit). The microprocessor may be constructed with a PLD (Programmable Logic Device) such as an FPGA (Field Programmable Gate Array) or an FPAA (Field Programmable Analog Array). The processing unit 130 can interpret and execute instructions from programs with the use of a processor to process various kinds of data and control programs. The programs to be executed by the processor are stored in at least one of a memory region of the processor and the storage unit 120.

The processing unit 130 may include a main memory. The main memory includes at least one of a volatile memory such as a RAM (Random Access Memory) and a nonvolatile memory such as a ROM (Read Only Memory).

For example, a DRAM, an SRAM, or the like is used as the RAM, a virtual memory space is assigned in the RAM and utilized as a working space of the processing unit 130. An operating system, an application program, a program module, program data, a look-up table, and the like that are stored in the storage unit 120 are loaded into the RAM for execution. The data, program, and program module that are loaded into the RAM are each directly accessed and operated by the processing unit 130.

In the ROM, a BIOS (Basic Input/Output System), firmware, and the like for which rewriting is not needed can be stored. Examples of the ROM include a mask ROM, an OTPROM (One Time Programmable Read Only Memory), and an EPROM (Erasable Programmable Read Only Memory). Examples of the EPROM include a UV-EPROM (Ultra-Violet Erasable Programmable Read Only Memory) which can erase stored data by ultraviolet irradiation, an EEPROM (Electrically Erasable Programmable Read Only Memory), and a flash memory.

For at least part of the processing of the document search system, AI is preferably used.

It is particularly preferable to use an artificial neural network (ANN; hereinafter just referred to as neural network) for the document search system. The neural network is obtained with a circuit (hardware) or a program (software).

In this specification and the like, a neural network refers to a general model that is modeled on a biological neural network, determines the connection strength of neurons by learning, and has the capability of solving problems. A neural network includes an input layer, intermediate layers (hidden layers), and an output layer.

In the description of the neural network in this specification and the like, to determine a connection strength of neurons (also referred to as weight coefficient) from the existing information is referred to as “learning” in some cases.

In this specification and the like, to draw a new conclusion from a neural network formed with the connection strength obtained by learning is referred to as “inference” in some cases.

For example, processing using AI can be used for one or both of the function of presenting a combination satisfying all search queries and the function of making an evaluation using a search result.

Output Unit 140

The output unit 140 outputs information on the basis of a processing result of the processing unit 130. For example, the output unit 140 can supply one or both of the arithmetic operation result and the inference result in the processing unit 130 to the outside of the document search system 100. Furthermore, the output unit 140 can output various kinds of data contained in a database on the basis of a processing result of the processing unit 130. The output unit 140 can output information to a display, a speaker, or the like used by the user.

Transmission Path 150

The transmission path 150 has a function of transmitting data. Data transmission and reception among the reception unit 110, the storage unit 120, the processing unit 130, and the output unit 140 can be performed through the transmission path 150.

A document search method and a method for outputting a document search result of the document search system of one embodiment of the present invention are described with reference to FIG. 2 to FIG. 7. Note that a display method using a display is given below as an example of the output method. That is, the method for displaying a document search result of one embodiment of the present invention is described below.

Method for Displaying Document Search Result

Figure 2:
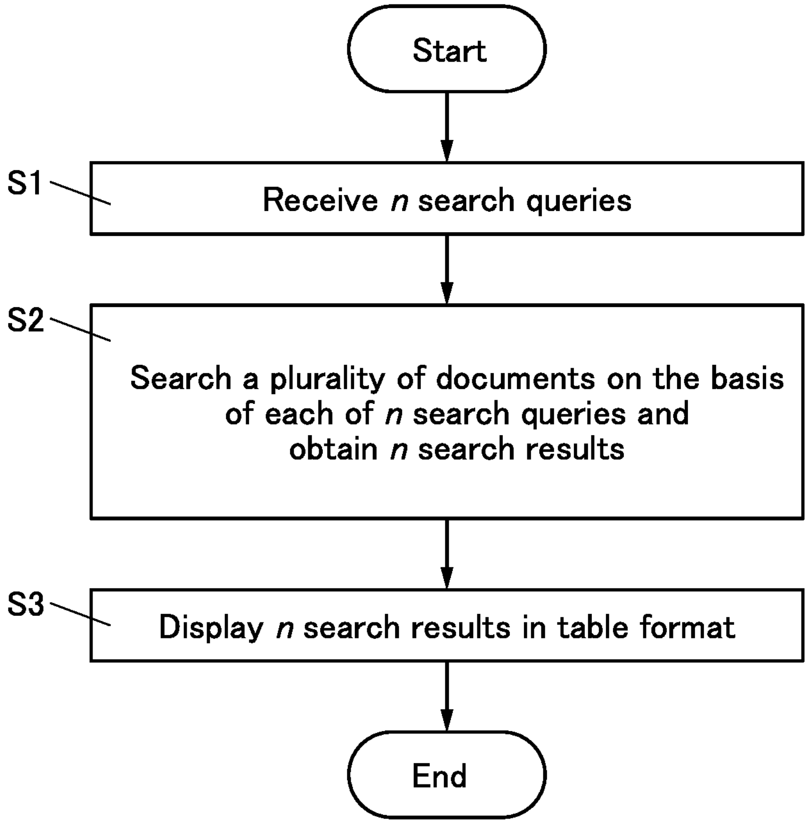
FIG. 2 is a diagram illustrating an example of a document search method.

The method for displaying a document search result of this embodiment includes processing of Step S1 to Step S3 shown in FIG. 2. FIG. 3 to FIG. 7 each illustrate an example of a graphical user interface (GUI) of the document search system of this embodiment. Icons, windows, buttons, text boxes, and the like in FIG. 3 to FIG. 7 are examples and there are no particularly limitations thereon. A GUI can be constructed as a web page accessed by the user via a network. Alternatively, a GUI can be constructed as a screen of a program application executed on an information processing device such as a personal computer used by the user.

Step S1

In Step S1, n search queries (n is a natural number) are received.

There is no particular limitation on the search queries received here. For example, a search formula created by combining a keyword and a logical operator can be received as the search query.

A region 300 in FIG. 3 to FIG. 7 is a region that the user can use to input search queries. In FIG. 3 to FIG. 7, a region 301*a* for inputting a first search query, a region 301*b* for inputting a second search query, and a region 301*c* for inputting a third search query are displayed in the region 300. The region 300 includes a plurality of regions for receiving search queries. Thus, a plurality of search queries can be received and a plurality of searches can be executed.

Figure 3A:
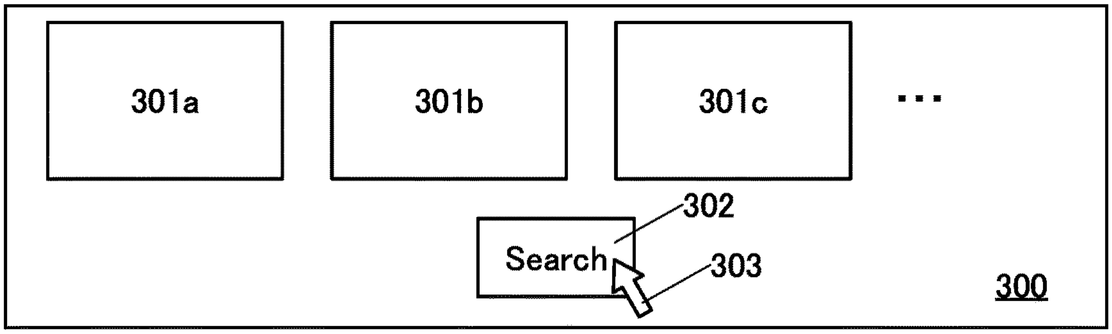
FIG. 3A and FIG. 3B each illustrate an example of a graphical user interface.

As shown in FIG. 3A, when the user selects an icon 302 marked "Search" with a mouse pointer 303 after inputting search queries in the region 300, the document search system receives the search queries and starts a search based on the search queries.

Note that designation of a plurality of documents to be searched may be received. Document designation can be received before the procedure proceeds to Step S2 and can be before or after Step S1.

For example, the user can input data (e.g., text data and image data) of a plurality of documents.

In the case where a document group to be searched is contained in a database or the like, the user can designate a plurality of document to be searched by inputting information identifying the documents. The document search system extracts data regarding the designated documents (specifically, data necessary for the following processing) from the database or the like on the basis of the information input by the user.

Examples of the information identifying the documents include an identification number of a document, a title, a date of issue or the like, an author name, and a publisher name.

In the case where the user does not designate documents to be searched, documents contained in a predetermined database or the like can be searched.

In the case where the document search system obtains a synonym from a thesaurus or the like using a keyword included in the received search queries, the synonym may be automatically added to the search queries. Alternatively, the synonym may be displayed and the user may be requested to review the search queries. For example, the user can perform at least one of addition, change, and deletion of a keyword with reference to the synonym.

Step S2

In Step S2, a plurality of documents are searched on the basis of each of the n search queries and n search results are obtained.

By performing Step S2, n search results can be obtained for the respective search targets. For example, in the case of m documents to be searched (m is a natural number), n search results can be obtained for each of the m documents.

Step S3

In Step S3, the n search results are displayed in a table format.

One of a group of items on the vertical axis and a group of items on the horizontal axis of the table represents documents, and the other represents search queries.

Figure 3B:
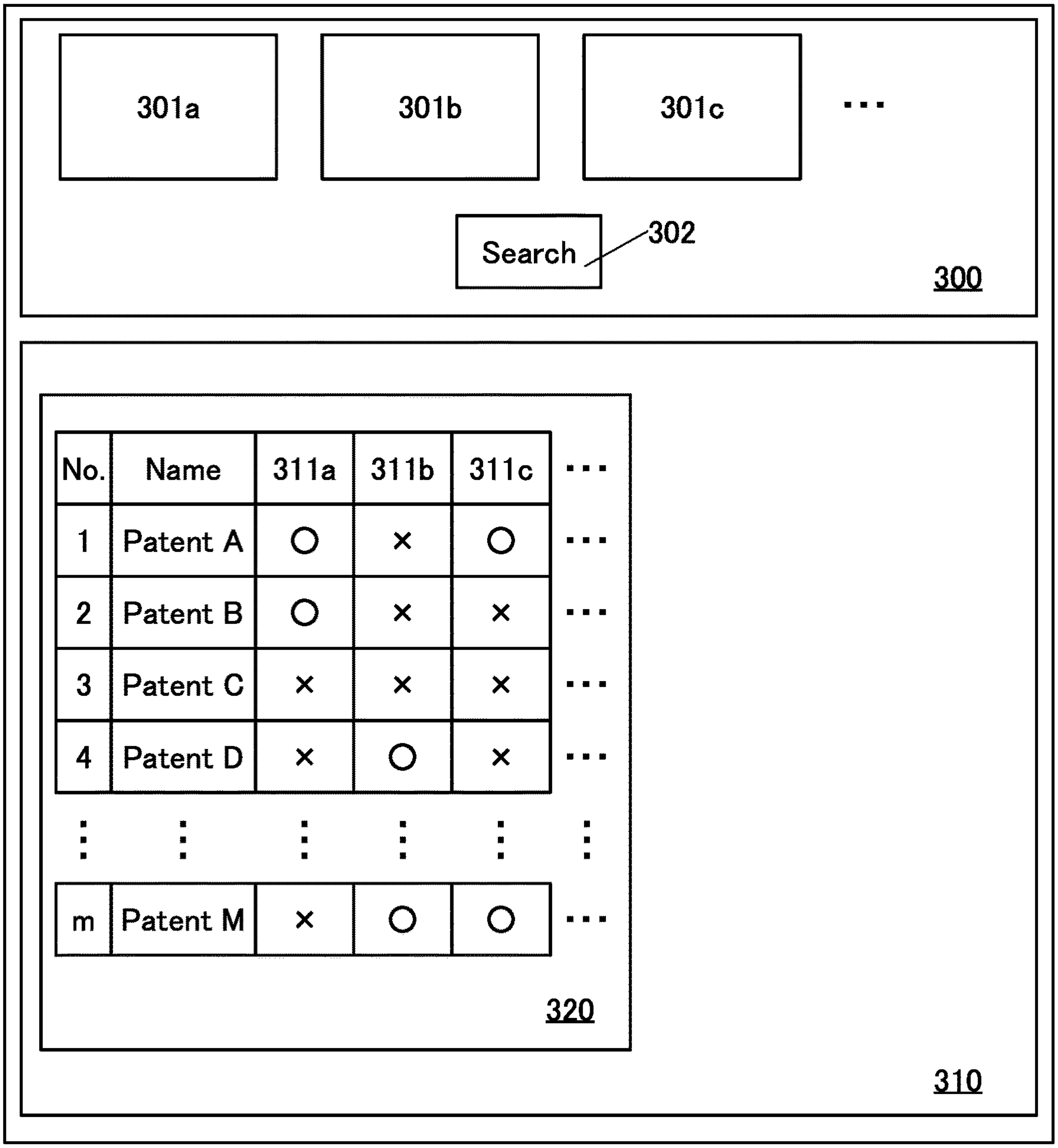
Figure 4:
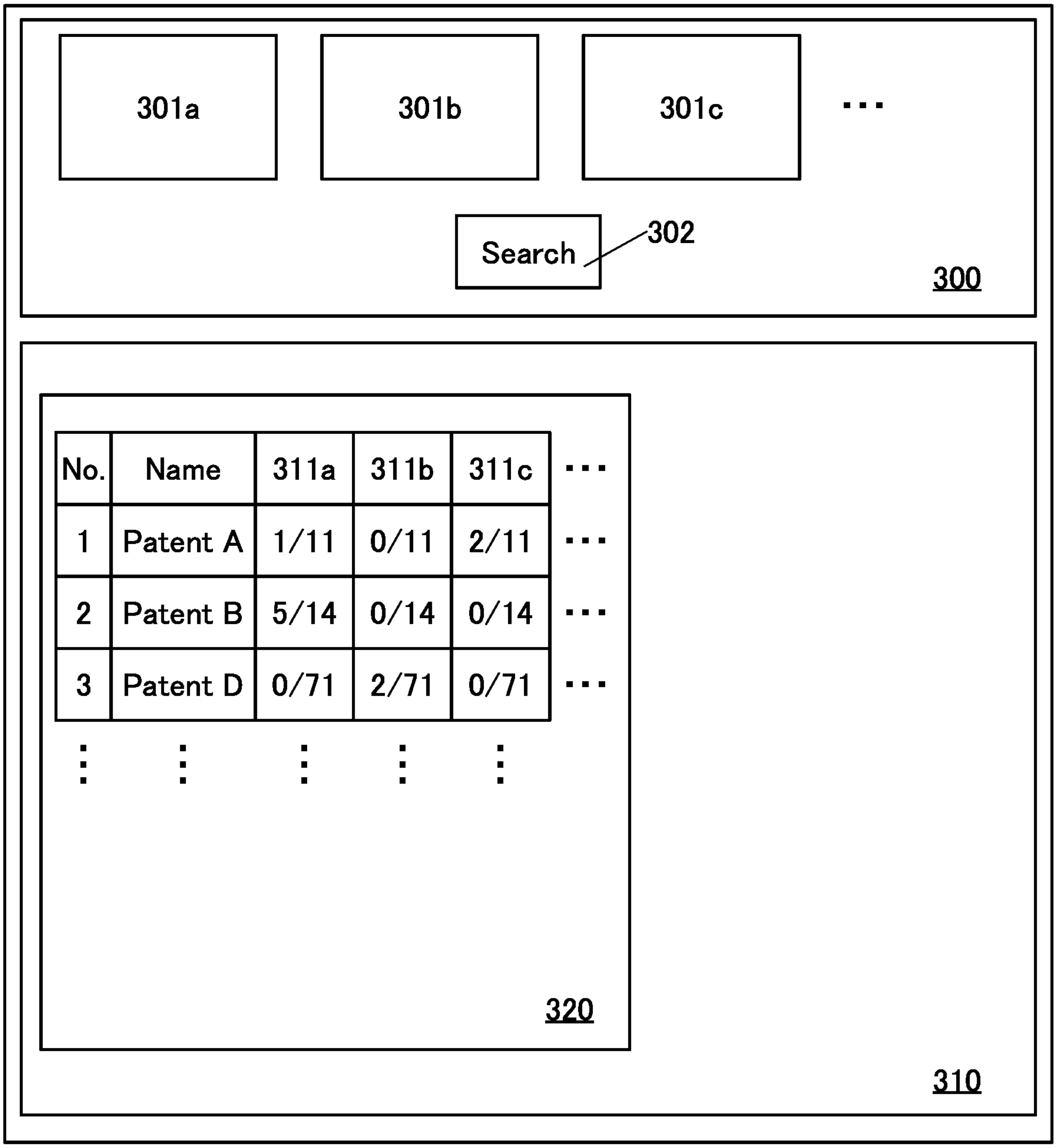
FIG. 4 illustrates an example of a graphical user interface.

A region 310 in FIG. 3B and FIG. 4 is a region for displaying search results. In FIG. 3B and FIG. 4, a table 320 showing the search results is displayed in the region 310.

In the table 320, the items on the vertical axis represent documents (items: Name, e.g., Patent A), and the items on the horizontal axis represent search queries (e.g., a first search query 311*a*).

For example, in the case where m documents are to be searched and n search queries are received, m×n search results are shown in the table 320.

FIG. 3B illustrates an example of showing search results with two values indicating whether or not a document satisfies a search query. From the table 320 in FIG. 3B, it is found that Patent A satisfies the first search query 311*a* and a third search query 311*c* (circles in the figure) and does not satisfy a second search query 311*b* (a cross mark in the figure). In addition, it is found that Patent D satisfies the second search query 311*b*. In the case where the user uses the results of the table 320 for the patent invalidity search, the user can quickly discover a possibility of using Patent A as a primary reference and Patent D as a secondary reference. Thus, by showing a summary of documents satisfying at least one or more of search queries in a table format, the document search results can be checked efficiently.

Furthermore, a combination of documents satisfying all the search queries among a plurality of documents each satisfying one or more of the search queries may be displayed. For example, in FIG. 3B, in the case where a search is made for the first search query 311*a*, the second search query 311*b*, and the third search query 311*c*, a combination of Patent A and Patent D, a combination of Patent A and Patent M, a combination of Patent B and Patent M, and the like can be displayed.

In the region 310, a result of evaluating a condition satisfying all the search queries using the search results may be displayed. For example, in the case where a plurality of search queries are created on the basis of an invention or a patented technique, the value of the technique can be evaluated from a plurality of obtained search results. For example, the value is high when there are few documents satisfying each search query, the value is low when there is a document satisfying all search queries, and the value is between high and low when there is a combination of a plurality of documents that satisfies all search queries. Thus, the document search system of this embodiment can be utilized for patent value evaluation.

FIG. 4 to FIG. 7 each illustrate a variation example of FIG. 3B. In the description of FIG. 4 to FIG. 7, description of portions common to FIG. 3B is omitted in some cases.

FIG. 4 illustrates an example showing search results using the number of paragraphs satisfying search queries in documents. From the table 320 in FIG. 4, it is found that Patent A is divided into 11 paragraphs and includes one paragraph satisfying the first search query 311*a*, no paragraph satisfying the second search query 311*b*, and two paragraphs satisfying the third search query 311*c*.

Note that a document can be divided into a plurality of blocks in accordance with various rules. Here, an example in which a document is divided in accordance with paragraphs is shown, but a document can be divided in accordance with chapters, headings, pages, sentences, or the like.

Note that FIG. 3B also shows the results of Patent C satisfying neither the first search query, nor the second search query, nor the third search query. In contrast, FIG. 4 does not show the results of Patent C. Results of a document satisfying no search queries may or may not be displayed in the table 320.

The order of documents is not particularly limited. For example, the results may be displayed in the registered order in a database. Alternatively, a document satisfying more search queries may be placed in the upper side of the table. Further alternatively, the user may choose a desired order from the a plurality of kinds of sorts.

Figure 5:
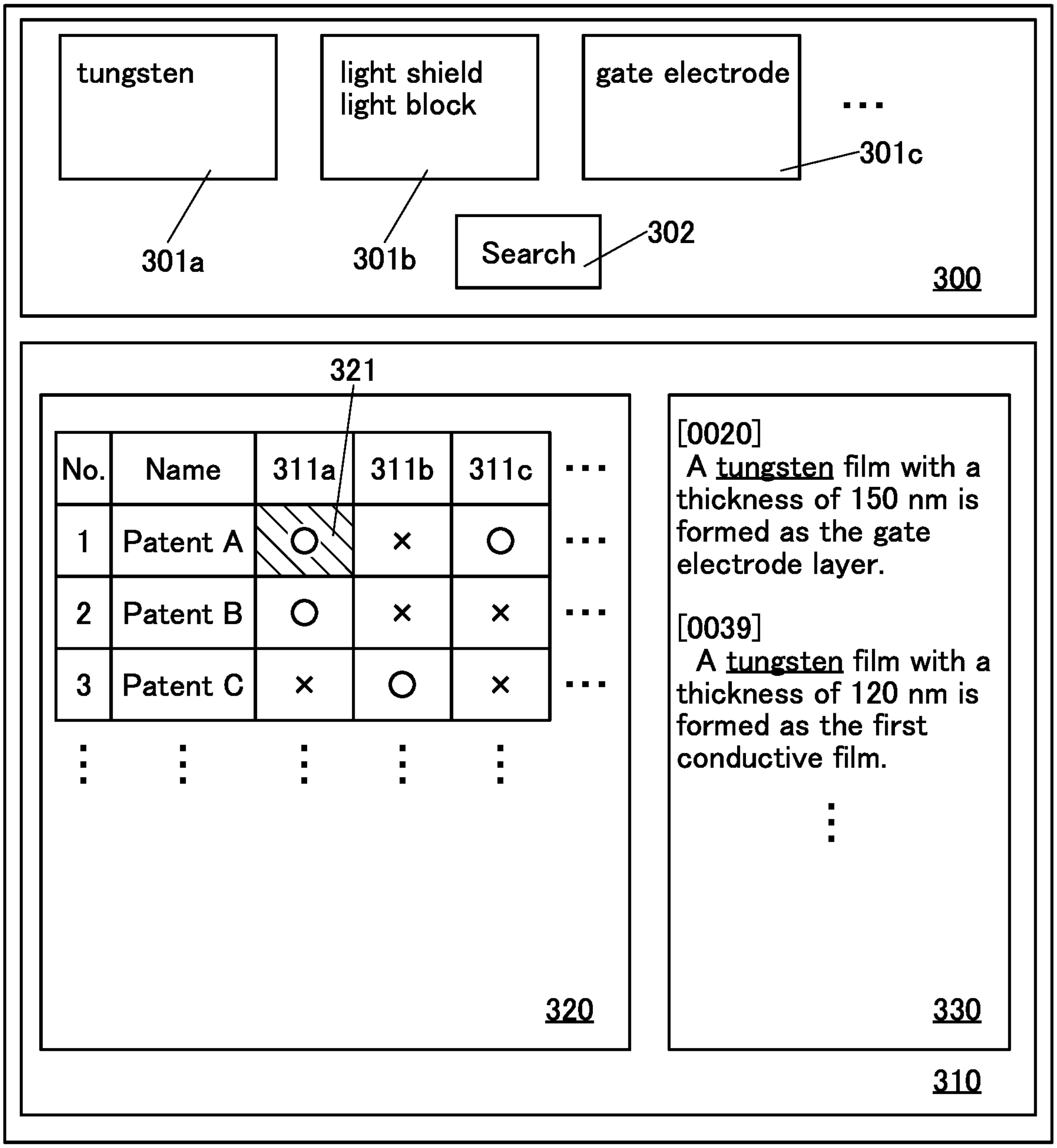
FIG. 5 illustrates an example of a graphical user interface.
Figure 6:
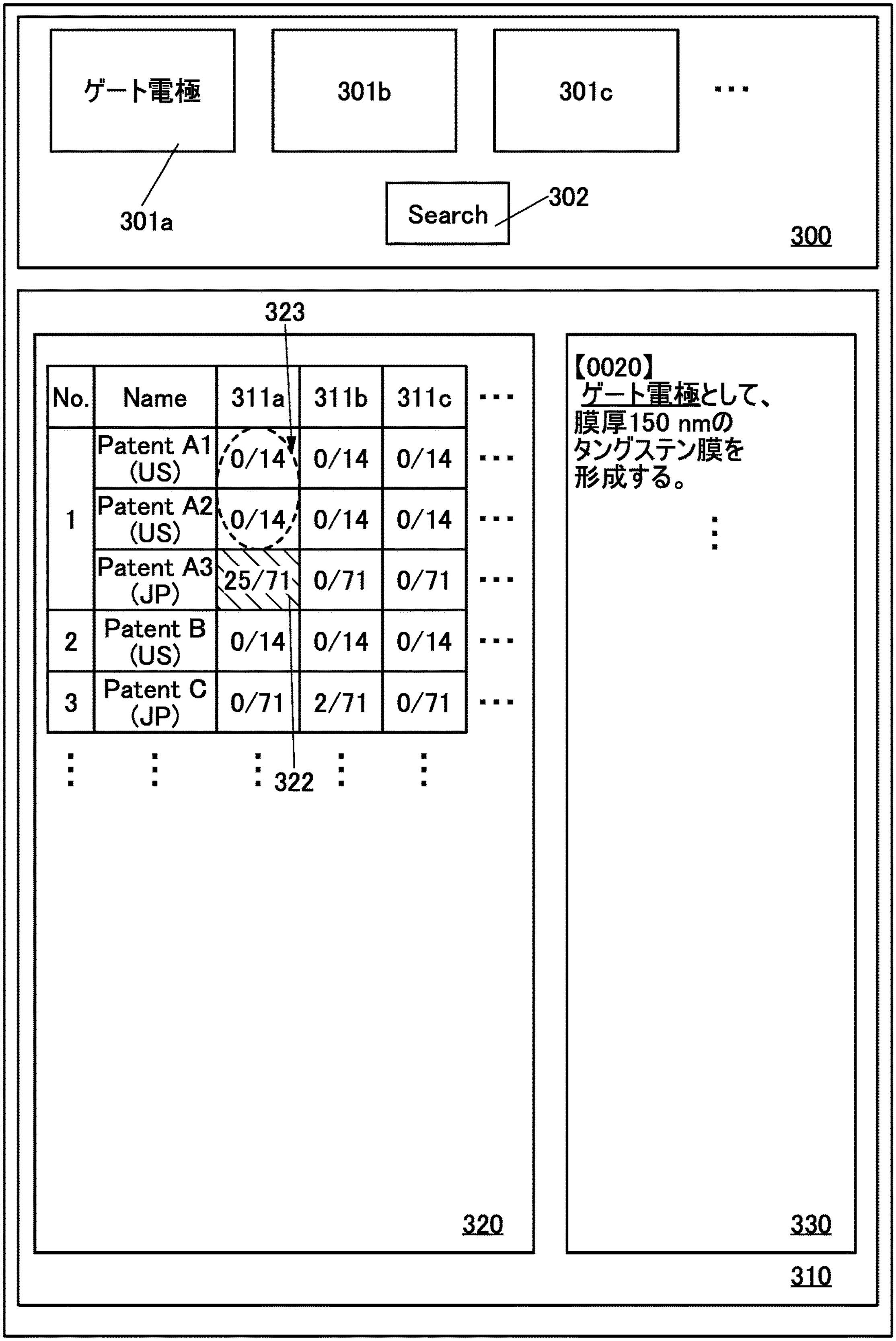
FIG. 6 illustrates an example of a graphical user interface.
Figure 7:
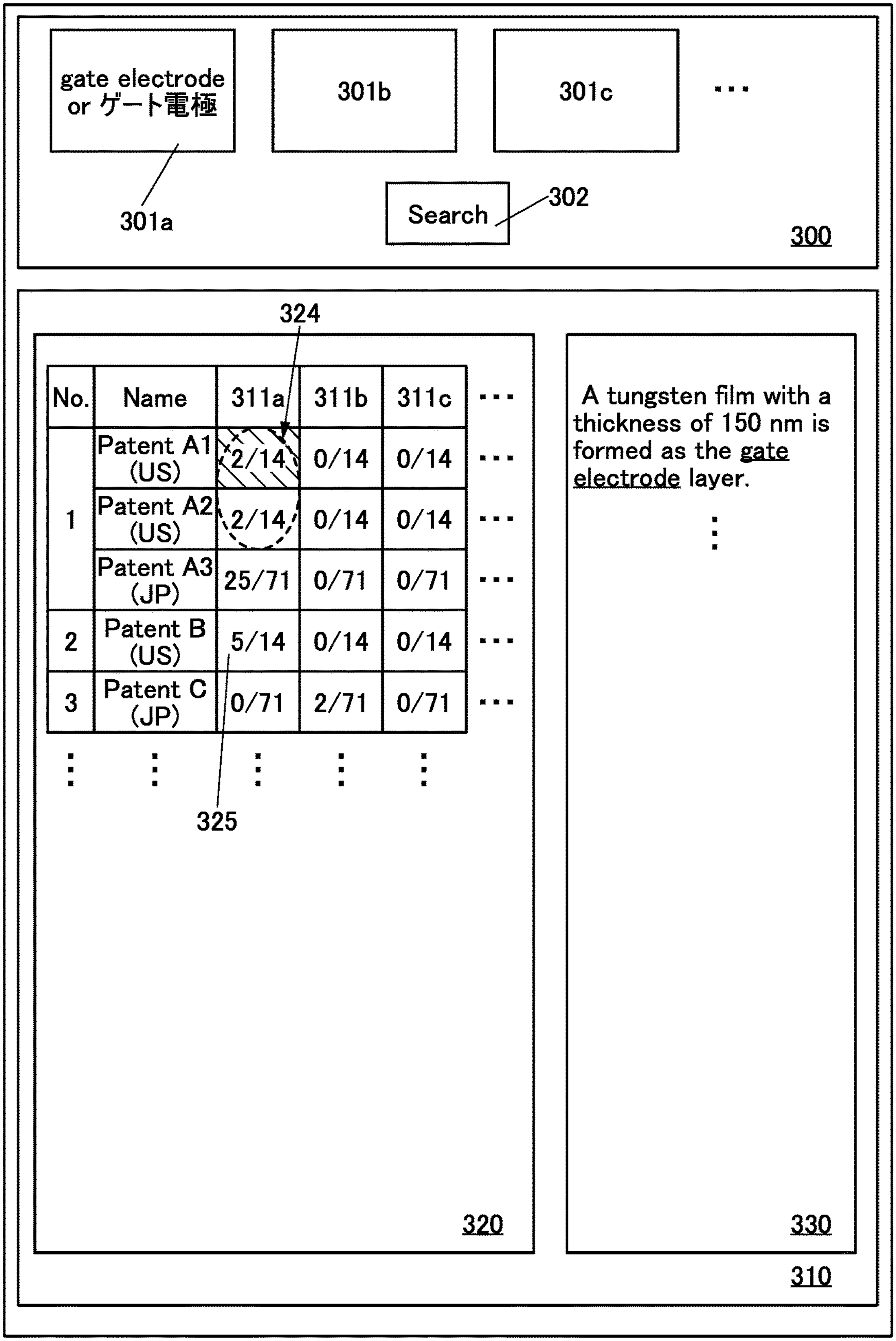
FIG. 7 illustrates an example of a graphical user interface.

FIG. 5 to FIG. 7 each show an example in which a region 330 for displaying a content of a document is included in the region 310 in addition to the table 320 showing the search results. FIG. 5 to FIG. 7 each show an example in which a sentence included in a document is displayed in the region 330. A diagram or the like included in a document may be displayed in the region 330.

When the user chooses one of the search results displayed in the table 320, a sentence satisfying a search query in a document, which corresponds to the chosen search result, can be displayed in the region 330. Thus, the content of a document as well as the search results can be checked in a short time.

In FIG. 5, a search result 321 is chosen. Sentences satisfying the first search query 311*a* in Patent A are displayed in the region 330. For example, a sentence satisfying the first search query 311*a* or a paragraph including the sentence can be displayed in the region 330. Furthermore, one or more sentences before or after the sentence or one or more paragraphs before or after the paragraph may also be displayed.

Here, from the region 301*a* for inputting a first search query, the first search query 311*a* is found to be a keyword "tungsten". The keyword is preferably highlighted in the region 330. FIG. 5 shows an example in which the keyword is underlined, but the highlighting method is not limited thereto. For example, a keyword in a sentence can be highlighted by thickening the line of a character, using a color for the keywords different from a color for other characters, highlighting the keyword with a marker, or the like.

In the region 301*b* for inputting a second search query, two keywords "light shield" and "light block" are listed. In the case where a plurality of keywords are listed in one search query, the document search system may automatically supplement a logical operator and execute a search. For example, execution of OR search may be set. That is, the second search query 311*b* can be regarded as a search formula "light shield" OR "light block". Thus, the user can omit input of a logical operator (OR) when OR search is to be executed, and a logical operator (e.g., AND) is input only when AND search or the like is to be executed. Thus, the user can input a search query in a simpler way. Furthermore, a keyword "gate electrode" is input in the region 301*c* for inputting a third search query. Although FIG. 5 shows an example in which the keyword in sentences shown in the region 330 is not highlighted, the keyword may be highlighted. In this case, it is preferable that the highlighting method be different from that for the keyword of the first search query 311*a*, such as using different colors.

In the case where patent documents are documents to be searched, documents belonging to the same patent family are preferably grouped using INPADOC (registered trademark) or the like. Documents belonging to the same patent family have high similarity; thus, by showing the grouped results, the efficiency of checking search results and the contents of the documents can be greatly increased.

FIG. 6 shows an example of displaying a grouped patent family. A group No. 1 includes Patent A1 (US), Patent A2 (US), and Patent A3 (JP).

Here, from the region 301*a* for inputting a first search query, the first search query 311*a* is found to be a Japanese keyword meaning "gate electrode". Thus, it is found that Patent A3 (JP) satisfies the first search query 311*a* as shown as a search result 322 while Patent A1 (US) and Patent A2 (US) in the same group do not satisfy the first search query 311*a* (see a region 323 surrounded by a dashed line), and an English keyword corresponding to the Japanese keyword lacks.

Thus, as shown in FIG. 7, the case is considered where the user adds an English term "gate electrode" in the region 301*a* for inputting a first search query. In this manner, Patent A1 (US) and Patent A2 (US) can satisfy the first search query 311*a* (see a region 324 surrounded by a dashed line).

Furthermore, it is found that Patent B (US), which does not satisfy the first search query 311*a* in FIG. 6, satisfies the first search query 311*a* in FIG. 7 as shown as a search result 325. Because a patent family of Patent B does not have a Japanese application, a search is not made at the stage of FIG. 6. That is, a document that the user is looking for and is not found at the stage of FIG. 6 can be found.

Thus, in the case where patent documents in multiple languages are to be searched, whether keywords in the respective languages are included can be easily checked by displaying a grouped patent family. In this manner, document searches can be performed with less variation among documents in multiple languages and search omission can be inhibited.

Note that an example in which the user adds a keyword is shown here; however, the document search system may infer a synonym from the keyword input by the user and add the synonym, or may propose addition of a synonym. As described above, as a synonym, in addition to a related term in the same language as the keyword, a term that is a translation of the keyword in another language and a related term thereof may be included. For example, the document search system of this embodiment can propose an English term "gate electrode" as a synonym of a Japanese keyword meaning "gate electrode".

Note that information displayed in the region 310, the table 320, and the region 330 is not limited to the information shown in the drawings. For example, information related to a document, a link to the information, or the like can be displayed. Furthermore, image data of a diagram, a table, a numerical expression, a chemical formula, or the like related to a sentence displayed in the region 330, a link to the image data, or the like may be displayed.

As described above, the document search system of this embodiment enables an efficient search using a plurality of search queries and an efficient check of search results. Thus, even in the case of many documents to be searched, needed information can be obtained in a short time. Moreover, even in the case of many documents to be searched, documents to be searched can be extracted without omission, and the content of extracted documents can be grasped efficiently.

This embodiment can be combined with the other embodiment as appropriate. In the case where a plurality of structure examples are described in one embodiment in this specification, the structure examples can be combined as appropriate.

Embodiment 2

In this embodiment, a document search system of one embodiment of the present invention is described with reference to FIG. 8 and FIG. 9.

Document Search System 2

Figure 8:
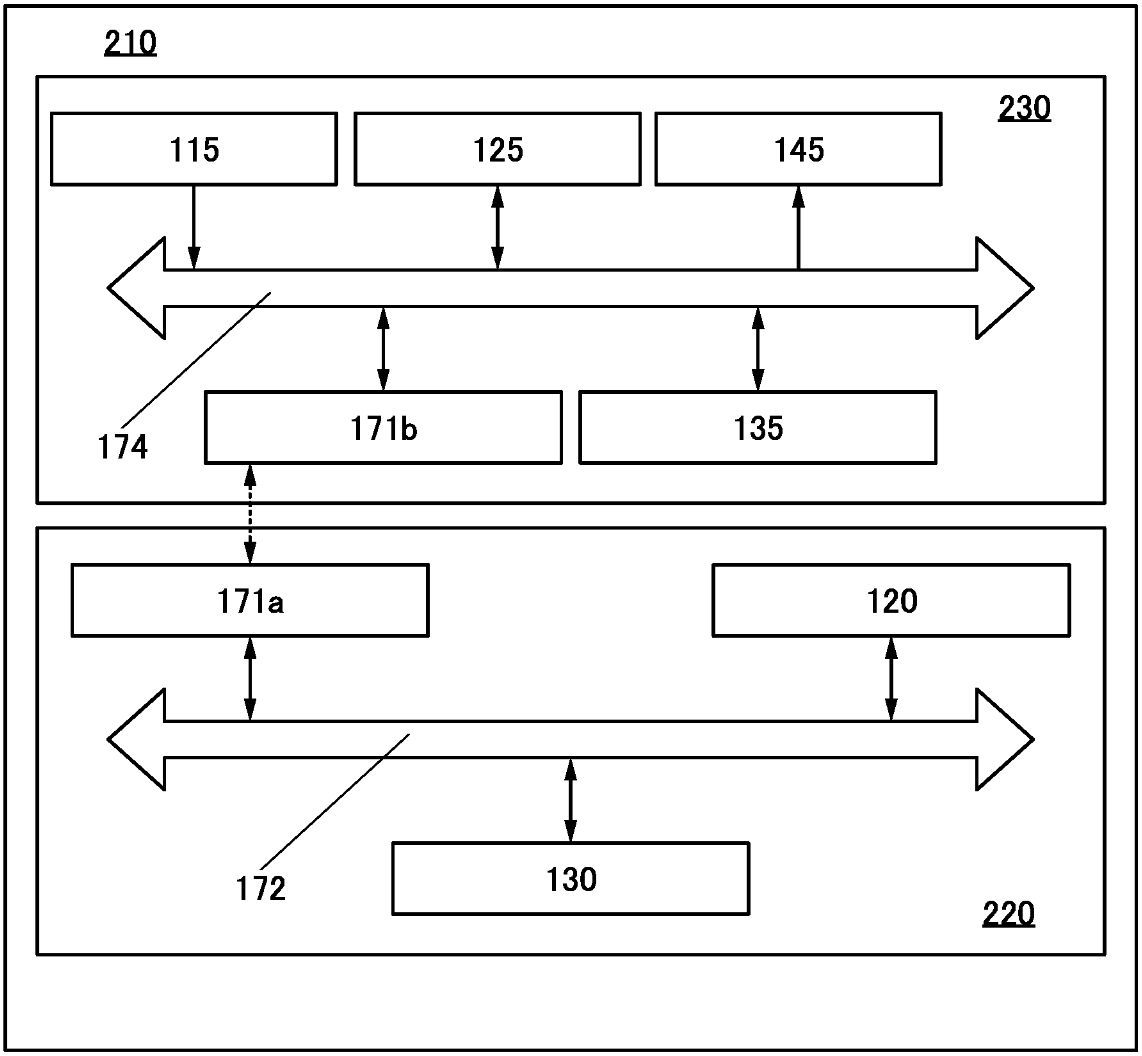
FIG. 8 is a diagram illustrating an example of a document search system.

FIG. 8 is a block diagram of a document search system 210. The document search system 210 includes a server 220 and a terminal 230 (e.g., a personal computer). Note that the description of <Document search system 1> in Embodiment 1 can be referred to for the same components as those in the document search system 100 shown in FIG. 1.

The server 220 includes a communication unit 171*a*, a transmission path 172, the storage unit 120, and the processing unit 130. Although not shown in FIG. 8, the server 220 may further include at least one of a reception unit, a database, an output unit, an input unit, and the like.

The terminal 230 includes a communication unit 171*b*, a transmission path 174, an input unit 115, a storage unit 125, a processing unit 135, and a display unit 145. Examples of the terminal 230 include a tablet personal computer, a laptop personal computer, and various portable information terminals. The terminal 230 may be a desktop personal computer without the display unit 145 and may be connected to a monitor functioning as the display unit 145, or the like.

A user of the document search system 210 inputs a search query from the input unit 115 in the terminal 230 to the server 220. Furthermore, information on a document group to be searched or information identifying the document group can also be input. These input contents are transmitted from the communication unit 171*b* to the communication unit 171*a*.

For example, a search query is transmitted from the communication unit 171*b* to the communication unit 171*a*. Furthermore, information on a document group to be searched or information identifying the document group may be transmitted.

The information received by the communication unit 171*a* is stored in a memory included in the processing unit 130 or the storage unit 120 via the transmission path 172. The information may be supplied from the communication unit 171*a* to the processing unit 130 via a reception unit (see the reception unit 110 illustrated in FIG. 1).

Various kinds of processing described in <Method for displaying document search result> in Embodiment 1 are performed in the processing unit 130. These kinds of processing require high processing capacity, and thus are preferably performed in the processing unit 130 included in the server 220. The processing unit 130 preferably has higher processing capacity than the processing unit 135.

A processing result of the processing unit 130 is stored in the memory included in the processing unit 130 or the storage unit 120 via the transmission path 172. After that, the processing result is output from the server 220 to the display unit 145 in the terminal 230. The processing result is transmitted from the communication unit 171*a* to the communication unit 171*b*. On the basis of the processing result of the processing unit 130, various kinds of data contained in a database may be transmitted from the communication unit 171*a* to the communication unit 171*b*. The processing result may be supplied from the processing unit 130 to the communication unit 171*a* via an output unit (the output unit 140 illustrated in FIG. 1).

Communication Unit 171*a* and Communication Unit 171*b*

The server 220 and the terminal 230 can transmit and receive data with the use of the communication unit 171*a* and the communication unit 171*b*. As the communication unit 171*a* and the communication unit 171*b*, a hub, a router, a modem, or the like can be used. Data may be transmitted and received through wire communication or wireless communication (e.g., radio waves or infrared rays).

Transmission Path 172 and Transmission Path 174

The transmission path 172 and the transmission path 174 have a function of transmitting data. The communication unit 171*a*, the storage unit 120, and the processing unit 130 can transmit and receive data via the transmission path 172. The communication unit 171*b*, the input unit 115, the storage unit 125, the processing unit 135, and the output unit 140 can transmit and receive data via the transmission path 174.

Input Unit 115

The input unit 115 can be used when the user designates a document group and a search query. For example, the input unit 115 can have a function of operating the terminal 230; specific examples thereof include a mouse, a keyboard, a touch panel, a microphone, a scanner, and a camera.

The document search system 210 may have a function of converting audio data into text data. For example, at least one of the processing unit 130 and the processing unit 135 may have this function.

The document search system 210 may have an optical character recognition (OCR) function. This enables characters contained in image data to be recognized and text data to be created. For example, at least one of the processing unit 130 and the processing unit 135 may have this function.

Storage Unit 125

The storage unit 125 may store one or both of the data on the designated document and the data supplied from the server 220. The storage unit 125 may include at least part of the data that can be included in the storage unit 120.

Processing Unit 130 and Processing Unit 135

The processing unit 135 has a function of performing arithmetic operation or the like with the use of data supplied from the communication unit 171*b*, the storage unit 125, the input unit 115, or the like. The processing unit 135 may have a function of performing at least part of processing that can be performed by the processing unit 130.

Each of the processing unit 130 and the processing unit 135 can include one or both of a transistor including a metal oxide in its channel formation region (OS transistor) and a transistor including silicon in its channel formation region (Si transistor).

In this specification and the like, a transistor including an oxide semiconductor or a metal oxide in a channel formation region is referred to as an oxide semiconductor transistor or an OS transistor. A channel formation region of an OS transistor preferably includes a metal oxide.

In this specification and the like, a metal oxide is an oxide of a metal in a broad sense. Metal oxides are classified into an oxide insulator, an oxide conductor (including a transparent oxide conductor), an oxide semiconductor (also simply referred to as an OS), and the like. For example, in the case where a metal oxide is used in a semiconductor layer of a transistor, the metal oxide is referred to as an oxide semiconductor in some cases.

The metal oxide included in the channel formation region preferably contains indium (In). When the metal oxide included in the channel formation region is a metal oxide containing indium, the carrier mobility (electron mobility) of the OS transistor is high. The metal oxide included in the channel formation region is preferably an oxide semiconductor containing an element M. The element M is preferably at least one of aluminum (Al), gallium (Ga), and tin (Sn). Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that a combination of two or more of the above elements may be used as the element M. The element M is, for example, an element that has high bonding energy with oxygen. The element M is, for example, an element that has higher bonding energy with oxygen than indium. The metal oxide included in the channel formation region is preferably a metal oxide containing zinc (Zn). The metal oxide containing zinc is easily crystallized in some cases.

The metal oxide included in the channel formation region is not limited to the metal oxide containing indium. The semiconductor layer may be a metal oxide that does not contain indium and contains zinc, a metal oxide that does not contain indium and contains gallium, a metal oxide that does not contain indium and contains tin, or the like, e.g., zinc tin oxide or gallium tin oxide.

The processing unit 130 preferably includes an OS transistor. The OS transistor has an extremely low off-state current; therefore, with the use of the OS transistor as a switch for retaining electric charge (data) that has flowed into a capacitor functioning as a memory element, a long data retention period can be ensured. When at least one of a register and a cache memory included in the processing unit 130 has such a feature, the processing unit 130 can be operated only when needed, and otherwise can be off while data processed immediately before turning off the processing unit 130 is stored in the memory element. In other words, normally-off computing is possible and the power consumption of the document search system can be reduced.

Display Unit 145

The display unit 145 has a function of displaying an output result. Examples of the display unit 145 include a liquid crystal display device and a light-emitting display device. Examples of light-emitting elements that can be used in the light-emitting display device include an LED (Light Emitting Diode), an OLED (Organic LED), a QLED (Quantum-dot LED), and a semiconductor laser. It is also possible to use, as the display unit 145, a display device using a MEMS (Micro Electro Mechanical Systems) shutter element, an optical interference type MEMS element, or a display device using a display element employing a microcapsule method, an electrophoretic method, an electrowetting method, an Electronic Liquid Powder (registered trademark) method, or the like, for example.

Figure 9:
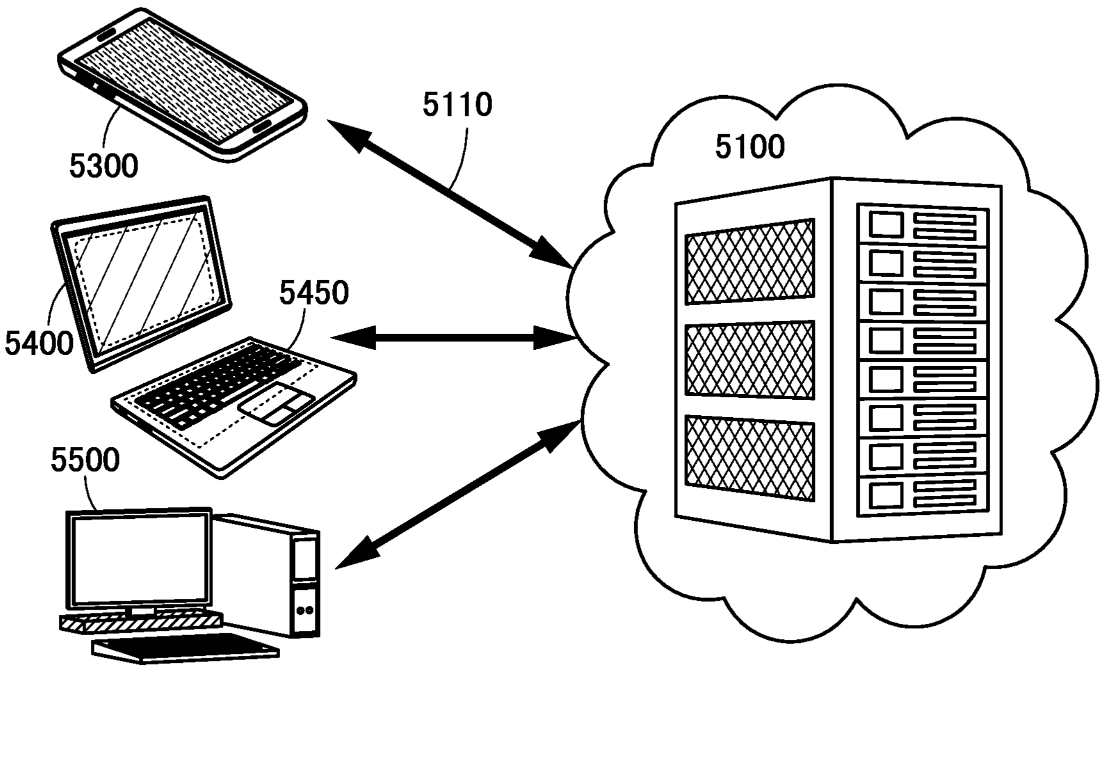
FIG. 9 is a diagram illustrating an example of a document search system.

FIG. 9 is a conceptual diagram of the document search system of this embodiment.

The document search system illustrated in FIG. 9 includes a server 5100 and terminals (also referred to as electronic devices). Communication between the server 5100 and each terminal is conducted via an Internet connection 5110.

The server 5100 is capable of performing arithmetic operation using data input from the terminal via the Internet connection 5110. The server 5100 is capable of transmitting an arithmetic operation result to the terminal via the Internet connection 5110. Accordingly, the burden of arithmetic operation on the terminal can be reduced.

In FIG. 9, an information terminal 5300, an information terminal 5400, and an information terminal 5500 are shown as the terminals. The information terminal 5300 is an example of a portable information terminal such as a smartphone. The information terminal 5400 is an example of a tablet terminal. When the information terminal 5400 is connected to a housing 5450 with a keyboard, the information terminal 5400 can be used as a notebook information terminal. The information terminal 5500 is an example of a desktop information terminal.

With such a structure, the user can access the server 5100 from the information terminal 5300, the information terminal 5400, the information terminal 5500, and the like. Then, through the communication via the Internet connection 5110, the user can receive a service offered by an administrator of the server 5100. Examples of the service include a service with the use of the document search method of one embodiment of the present invention. In the service, artificial intelligence may be utilized in the server 5100.

This embodiment can be combined with the other embodiment as appropriate.

REFERENCE NUMERALS

100: document search system, 110: reception unit, 115: input unit, 120: storage unit, 125: storage unit, 130: processing unit, 135: processing unit, 140: output unit, 145: display unit, 150: transmission path, 171*a*: communication unit, 171*b*: communication unit, 172: transmission path, 174: transmission path, 210: document search system, 220: server, 230: terminal, 300: region, 301*a*: region, 301*b*: region, 301*c*: region, 302: icon, 303: mouse pointer, 310: region, 311*a*: first search query, 311*b*: second search query, 311*c*: third search query, 320: table, 321: search result, 322: search result, 323: region, 324: region, 325: search result, 330: region, 5100: server, 5110: Internet connection, 5300: information terminal, 5400: information terminal, 5450: housing, 5500: information terminal.

The invention claimed is:

1. A method for outputting a document search result, comprising:

receiving a plurality of search queries;

extracting a keyword from the plurality of search queries, obtaining a synonym of the keyword, updating the plurality of search queries using the synonym, searching a plurality of documents based on each search query of the plurality of search queries, obtaining a plurality of search results for each document of the plurality of documents;

dividing each document of the plurality of documents into a plurality of blocks;

displaying the plurality of search results for each document of the plurality of documents as a first table on a Graphical User Interface;

presenting a combination of documents satisfying all search queries among the plurality of documents, each document satisfying one or more of the plurality of search queries, and displaying a sentence satisfying a search query in a document, when a user chooses one of the search results, wherein the synonym comprises a translation of the keyword in another language, wherein the plurality of documents is patent documents, and wherein the first table shows the plurality of documents belonging to a same patent family are preferably grouped, wherein one of a group of items on a vertical axis and a group of items on a horizontal axis of the first table represents the documents, and the other of the group of items on the vertical axis and the group of items on the horizontal axis of the first table represents the search queries, wherein the first table shows search results using a number of blocks satisfying search queries in the plurality of blocks, and wherein the combination of documents including a smaller number of documents is preferentially presented.

2. The method for outputting a document search result, according to claim 1, wherein the first table shows each search result with two values indicating whether or not each document satisfies each search query.

3. The method for outputting a document search result, according to claim 1, wherein the first table shows each search result with a number of blocks satisfying each search query in each document.

4. The method for outputting a document search result, according to claim 1, further comprising a step of receiving designation of the plurality of documents before searching the plurality of documents.

5. A document search system comprising:

a reception unit;

a processing unit comprising an arithmetic circuit; and an output unit, wherein the reception unit is configured to receive a plurality of search queries, wherein the processing unit is configured to extract a keyword from the plurality of search queries, wherein the processing unit is configured to obtain a synonym of the keyword, wherein the processing unit is configured to update the plurality of search queries using the synonym, wherein the processing unit is configured to search a plurality of documents based on each search query of the plurality of search queries and to obtain a plurality of search results for each document of the plurality of documents, wherein the processing unit is configured to divide each document of the plurality of documents into a plurality of blocks, wherein the processing unit is configured to present a combination of documents satisfying all search queries among the plurality of documents, each document satisfying one or more of the plurality of search queries, wherein the output unit is configured to output the plurality of search results for each document of the plurality of documents as a first table on a display, wherein the processing unit is configured to display a sentence satisfying a search query in a document, when a user chooses one of the search results, wherein the synonym comprises a translation of the keyword in another language, wherein the plurality of documents is patent documents, wherein the first table shows the plurality of documents belonging to a same patent family are preferably grouped, wherein one of a group of items on a vertical axis and a group of items on a horizontal axis of the first table represents a plurality of documents, and the other of the group of items on the vertical axis and the group of items on the horizontal axis of the first table represents a plurality of search queries, wherein the first table shows search results using a number of blocks satisfying search queries in the plurality of blocks, and wherein the combination of documents the plurality of search results including a smaller number of documents is preferentially present.

6. The document search system according to claim 5, wherein the first table shows each search result with two values indicating whether or not each document satisfies each search query.

7. The document search system according to claim 5, wherein the first table shows each search result with a number of blocks satisfying each search query in each document.

8. The document search system according to claim 5, wherein the reception unit is configured to receive designation of the plurality of documents.

9. A document search system comprising:

a reception unit;

a processing unit comprising an arithmetic circuit; and an output unit, wherein the reception unit is configured to receive at least a first search query and a second search query, wherein the processing unit is configured to extract a keyword from the first search query or the second search query, wherein the processing unit is configured to obtain a synonym of the keyword, wherein the processing unit is configured to update the first search query or the second search query using the synonym, wherein the processing unit is configured to search a plurality of documents using each of the first search query and the second search query and to obtain a first search result based on the first search query and a second search result based on the second search query for each document of the plurality of documents, wherein the processing unit is configured to divide each document of the plurality of documents into a plurality of blocks, wherein the processing unit is configured to present a combination of documents satisfying all search queries among the plurality of documents, each document satisfying one or more of the plurality of search queries, wherein the output unit is configured to output the first search result and the second search result for each document of the plurality of documents as a first table on a display, wherein the processing unit is configured to display a sentence satisfying the first search result or the second search result in a document, when a user chooses one of the search results, wherein the synonym comprises a translation of the keyword in another language, wherein the plurality of documents is patent documents, and wherein the first table shows the plurality of documents belonging to a same patent family are preferably grouped, wherein the first table comprises the first search result for each document of the plurality of documents in a first column and the second search result for each document of the plurality of documents in a second column, wherein the first table shows search results using a number of blocks satisfying search queries in the plurality of blocks, and wherein the combination of documents including a smaller number of documents is preferentially present.

10. The document search system according to claim 9, wherein the first table shows the first search result with two values indicating whether or not each document satisfies the first search query.

11. The document search system according to claim 9, wherein the first table shows the first search result with a number of blocks satisfying the first search query in each document.

12. A document search system comprising:

a reception unit;

a processing unit comprising an arithmetic circuit; and an output unit, wherein the reception unit is configured to receive at least a first search query and a second search query, wherein the processing unit is configured to extract a keyword from the first search query or the second search query, wherein the processing unit is configured to obtain a synonym of the keyword, wherein the processing unit is configured to update the first search query or the second search query using the synonym, wherein the processing unit is configured to search a plurality of documents using each of the first search query and the second search query and to obtain a first search result based on the first search query and a second search result based on the second search query for each document of the plurality of documents, wherein the processing unit is configured to divide each document of the plurality of documents into a plurality of blocks, wherein the processing unit is configured to present a combination of documents satisfying all search queries among the plurality of documents, each document satisfying one or more of the plurality of search queries, wherein the output unit is configured to output the first search result and the second search result for each document of the plurality of documents as a first table on a display, wherein the processing unit is configured to display a sentence satisfying the first search query or the second search query in a document, when a user chooses the first search result or the second search result, wherein the synonym comprises a translation of the keyword in another language, wherein the plurality of documents is patent documents, wherein the first table shows the plurality of documents belonging to a same patent family are preferably grouped, wherein the first table comprises the first search result for each document of the plurality of documents in a first row and the second search result for each document of the plurality of documents in a second row, wherein the first table shows search results using a number of blocks satisfying search queries in the plurality of blocks, and wherein the combination of documents including a smaller number of documents is preferentially present.

13. The document search system according to claim 12, wherein the first table shows the first search result with two values indicating whether or not each document satisfies the first search query.

14. The document search system according to claim 12, wherein the first table shows the first search result with a number of blocks satisfying the first search query in each document.

* * * * *